(12) United States Patent
Kalb

(10) Patent No.: US 7,404,536 B2
(45) Date of Patent: Jul. 29, 2008

(54) SUCTION CUP ASSEMBLY INCLUDING A QUICK RELEASE VENTURI

(75) Inventor: James R. Kalb, Petersburg, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 773 days.

(21) Appl. No.: 10/460,847

(22) Filed: Jun. 13, 2003

(65) Prior Publication Data
US 2003/0230694 A1 Dec. 18, 2003

Related U.S. Application Data

(60) Provisional application No. 60/389,489, filed on Jun. 18, 2002.

(51) Int. Cl.
*A45D 42/14* (2006.01)

(52) U.S. Cl. .................. 248/362; 248/205.5; 248/309.3; 239/398; 239/424.5

(58) Field of Classification Search ............... 248/362, 248/205.5, 309.3, 363; 239/398, 424.5, 283; 271/11, 102; 294/64.1, 64.2, 65
See application file for complete search history.

(56) References Cited

U.S. PATENT DOCUMENTS

| 3,638,864 | A | * | 2/1972 | Roeder et al. | 239/280.5 |
|---|---|---|---|---|---|
| 3,648,853 | A | * | 3/1972 | Winne | 414/744.3 |
| 3,716,307 | A | * | 2/1973 | Hansen | 417/191 |
| 4,828,306 | A | * | 5/1989 | Blatt | 294/64.2 |
| 5,681,022 | A | * | 10/1997 | Rankin | 248/363 |
| 5,727,418 | A | * | 3/1998 | Strozier | 72/457 |
| 5,979,889 | A | * | 11/1999 | Klopfenstein | 271/11 |
| 6,024,392 | A | * | 2/2000 | Blatt | 294/64.1 |
| 6,103,011 | A | * | 8/2000 | Riera | 118/264 |
| 6,213,521 | B1 | * | 4/2001 | Land et al. | 285/61 |
| RE37,617 | E | * | 4/2002 | Sherman | 137/557 |

* cited by examiner

*Primary Examiner*—Amy J. Sterling
(74) *Attorney, Agent, or Firm*—Carlson, Gaskey & Olds

(57) ABSTRACT

A suction cup removably attached to a housing lifts and moves an object. A venturi removably attached to the housing provides a vacuum effect to secure the suction cup to the object. The venturi includes a pair of opposing ears. When the venturi is inserted into a venturi hole of the housing, the ears compress a pin. When the venturi is rotated to an attached position, the ears do not contact the pin, and a spring biases the pin outwardly to secure the venturi to the housing. The pin is coupled to a button on the housing that can be slid to move the pin inwardly to allow rotation and removal of venturi.

17 Claims, 4 Drawing Sheets

SUCTION CUP ASSEMBLY INCLUDING A QUICK RELEASE VENTURI

This patent application claims priority to provisional patent application 60/389,489 filed on Jun. 18, 2002.

BACKGROUND OF THE INVENTION

The present invention relates generally to a suction cup assembly including a housing having a venturi removably connected to the housing in a quick connect attachment and a suction cup to lift and move an object.

Suction cups are commonly employed to lift and moves objects in an industrial application. Suction cups include a substantially conical body and are usually formed of a resilient material, such as plastic or rubber. When the body of the suction cup is placed against the object, a vacuum source expels air within a cavity formed by the conical body. As the air is expelled, the suction cup forms a tight seal on the object, allowing the object to be lifted and moved. The suction cup is usually mounted to a housing including a clamping stem. A robot arm of a tooling machine attached to the clamping stem moves the suction cup and the attached object.

A suction cup occasionally needs to be replaced due to breakage, wear, or because a suction cup of a different shape or size is needed. Therefore, it is desirable that the suction cup is able to be changed quickly and easily.

A venturi is commonly employed to provide the vacuum source that attaches the suction cup to the object. In one prior art suction cup assembly, the venturi is secured to the housing by a pair of bolts. Another prior art venturi is integrated in the housing. However, the venturi is internal, and it cannot be easily removed from the housing when cleaning is necessary. Additionally, in the prior art, the exhaust hole of the venturi is large, requiring a shuttle valve to block air expulsion from the exhaust hole.

Hence, there is a need in the art for a suction cup assembly including a venturi that is removably connected to a housing.

SUMMARY OF THE INVENTION

An industrial assembly includes a suction cup removably attached to a housing to lift and move an object. A venturi withdraws air inside the suction cup to form a vacuum on the object, allowing the object to be lifted.

A bayonet coupling of the suction cup is received in a quick connect attachment in the housing. The bayonet coupling includes a pair of opposing ears. The bottom of the housing includes a base, a pair of opposing flanges and a pair of opposing openings between the flanges. A gap is defined between the flanges and the base.

A pin is biased into one of the openings by a spring. When the ears of the bayonet coupling are positioned in the openings, an ear pushes on the pin and compress the spring. After the bayonet coupling is rotated 90°, the ears are located in the gaps under the flanges. The ear no longer compresses the pin, and the spring biases the pin into the opening, securing the suction cup to the housing. When the suction cup is to be removed from the housing, a slidable button coupled to the pin is slid to compress the spring and remove the pin from the opening. The suction cup can then be rotated 90° to align the ears of the bayonet coupling with the openings for removal of the suction cup from the housing.

A venturi in combination with the vacuum source provides the vacuum effect to secure the suction cup to an object. The venturi is removably connected to the housing in a quick connect attachment. The venturi includes a pair of opposing ears. The housing includes a venturi hole that receives the venturi, a ledge surrounding the venturi hole, a pair of opposing flanges, and a pair of opposing openings between the flanges. A gap is defined between the flanges and the ledge.

A pin is biased into one of the openings by a spring. When the ears of the venturi are positioned in the openings, an ear pushes on the pin and compress the spring. After the venturi is rotated 90°, the ears are located in the gaps under the flanges. The ear no longer compresses the pin, and the spring biases the pin into the opening, securing the venturi to the housing. When the venturi is to be removed from the housing, a slidable button coupled to the pin is slid to compress the spring and remove the pin from the opening. The venturi can then be rotated 90° to align the ears of the venturi with the opening for removal of the venturi from the housing.

A blow off tube inserted into a blow off port provides air to release the suction cup from the object. The housing further includes a small exhaust hole that allows the air from the venturi or the blow off tube to escape from the housing. The venturi hole and the blow off port both communicate with the exhaust hole.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
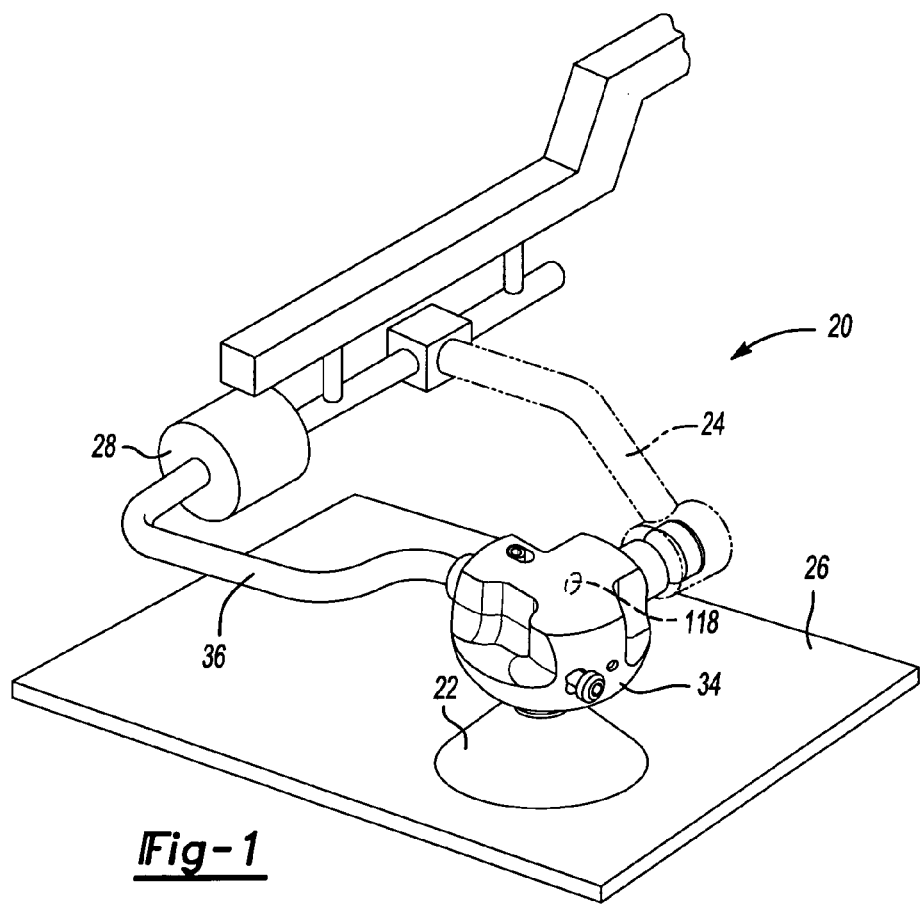
FIG. 1 illustrates an industrial application including a robotic arm and a suction cup.
Figure 2:
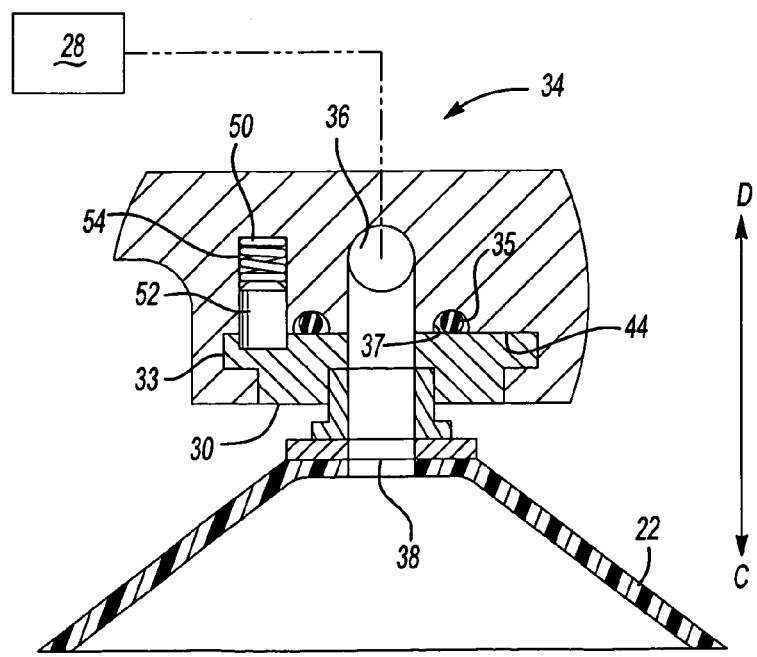
FIG. 2 illustrates a cross-sectional side view of the housing and suction cup of the present invention.
Figure 3:
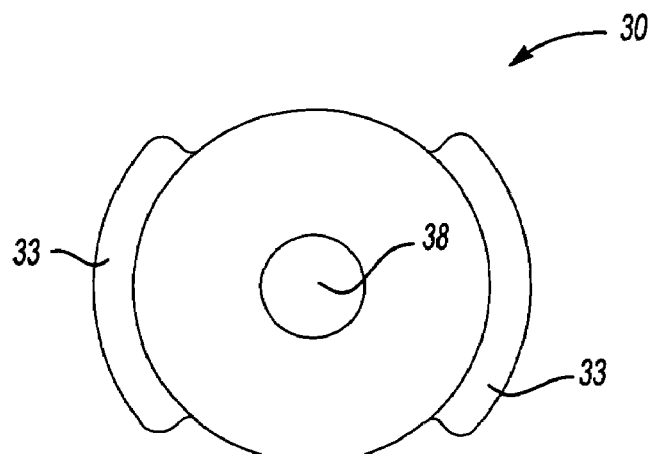
FIG. 3 illustrates a top view of the bayonet coupling of the suction cup.

FIG. 1 illustrates selected portions of an example industrial assembly 20 including a housing 34 moveable by a robotic arm 24. A suction cup 22 removably attached to the housing 34 is employed to lift and move an object 26. A pressurized air source 28, schematically shown, provides pressurized air that creates a vacuum inside a cavity of the suction cup 22 to form a vacuum on the object 26, allowing the object 26 to be lifted and moved. The vacuum source 28 is of a conventional type and is known in the art.

As shown in FIGS. 2-5, a bayonet coupling 30 is fixed to the suction cup 22. The bayonet coupling 30 is received in a quick connect attachment in an opening 32 in the housing 34 to allow the suction cup 22 to be quickly and easily attached to and detached from the housing 34. The bayonet coupling 30, shown in FIG. 3, includes a pair of opposing ears 33.

The pressurized air source 28 provides pressurized air through a connector hose 36 (FIG. 1). The pressurized air flows through a venturi (described below) which creates a vacuum. The air then flows through a central passage 38 in the housing 34, to secure the suction cup 22 to the object 26.

The housing 34 further includes a mounting stem 40 shaped to be accommodated by a variety of clamps which are known in the art. The mounting stem 40 can be cylindrical, ball shaped, or any other shape. The mounting stem 40 is located so that housing 34 can be clamped in any position relative to the clamp. The suction cup 22 can then be removed from the housing 34 while maintaining the positioning of the housing 34 relative to the clamp.

Figure 4:
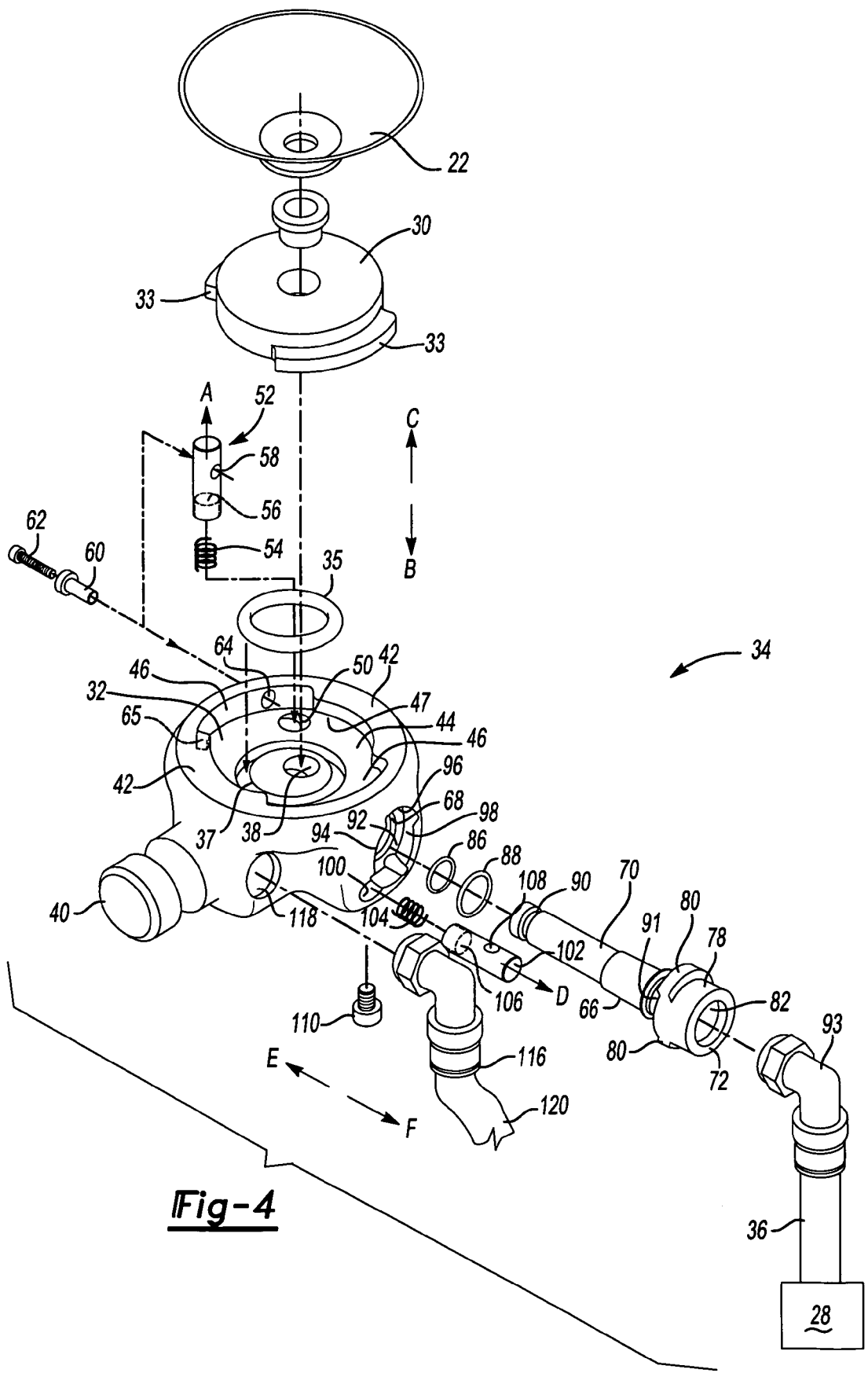
FIG. 4 illustrates a bottom perspective exploded view of the housing.

FIG. 4 illustrates a perspective exploded bottom view of the housing 34. The housing 34 includes a base 44, a pair of opposing flanges 42, and an opening 46 between each of the flanges 42 that is sized and shaped to receive an ear 33 of the bayonet coupling 30. A gap 47 is defined between the flanges 42 and the base 44 such that the opposing ears 33 of the bayonet coupling 30 can be inserted into the openings 46 of the housing 34 and twisted such that the ears 33 are received into the gap 47 to secure the bayonet coupling 30 within the housing 34. A seal 35 is received in a groove 37 around the central passage 38 in the base 44 of the housing 34. When the bayonet coupling 30 is attached to the housing, the seal 35 provides sealing between the bayonet coupling 30 and the central passage 38. The seal 35 can be an o-ring.

The housing 34 further includes a pinhole 50 that receives a pin 52 and a spring 54. The pin 52 includes a recess 56 that receives the spring 54 and a through hole 58 perpendicular to the longitudinal axis A of the pin 52. The spring 54 biases the pin 52 in the direction C and into one of the openings 46 of the housing 34.

Figure 5:
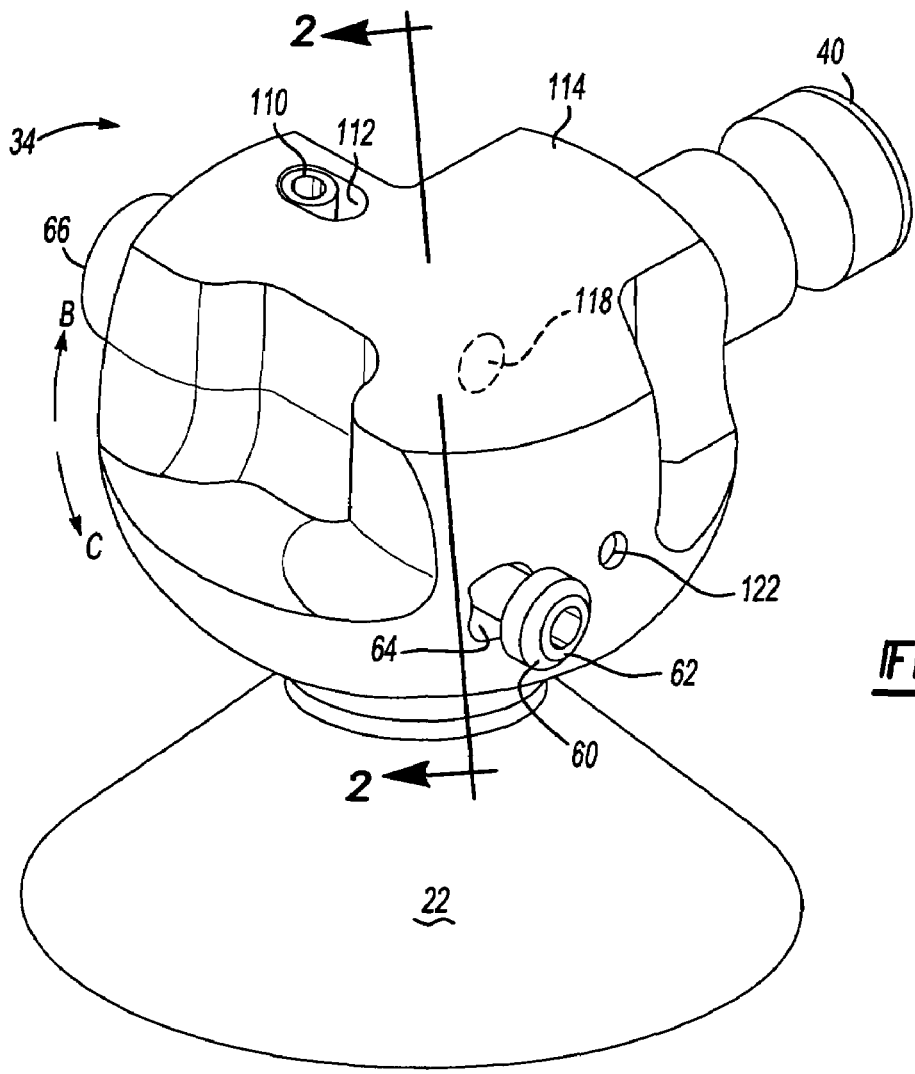
FIG. 5 illustrates top perspective view of the housing.

As shown in FIG. 5, a button 60 is slidably received in a slot 64 of the housing 34 in directions B and C. A lock pin 62 moveable by the button 60 is received in the through hole 58 of the pin 52. The lock pin 62 couples the button 60 to the pin 52. When a button 60 is slid in direction B against the bias of the spring 54, the lock pin 62 that is received in the through hole 58 of the pin 52 removes the pin 52 from the opening 32.

Returning to FIG. 4, when attaching the suction cup 22 to the housing 34, the bayonet coupling 30 is positioned in the opening 32 such that the bayonet coupling 30 contacts the base 44, and the ears 33 are received in the openings 46. In the non-attached position, the ears 33 are non-aligned with the flanges 42. One of the ears 33 of the bayonet coupling 30 presses the pin 52 in direction B and into the pinhole 50 such that the pin 52 does not enter the opening 46. The bayonet coupling 30 is then rotated approximately ninety degrees until the ears 33 of the bayonet coupling 30 align with the flanges 42. The bayonet coupling 30 is then in the attached position.

A stop 65 positioned in the gap 47 under one of the flanges 42 prevents further rotation of the bayonet coupling 30 once the bayonet coupling 30 is in the attached position. In the attached position, the bayonet coupling 30 no longer presses the pin 52, and the pin 52 is biased by the spring 54 in direction C into the opening 46, securing the bayonet coupling 30 to the housing 32. The bayonet coupling 30 cannot be rotated to the non-attached position because the pin 52 prevents rotation.

When the suction cup 22 is to be removed from the housing 34, the button 60 is slid in the slot 64 in direction B, and the lock pin 62 withdraws the pin 52 from the opening 32, compressing the spring 54. This allows for subsequent rotation of the bayonet coupling 30 ninety degrees to the non-attached position, moving the ears 33 out of alignment with the flanges 42. The ears 33 are then aligned with the opening 46, and the suction cup 22 can then be removed from the housing 34.

Figure 6:
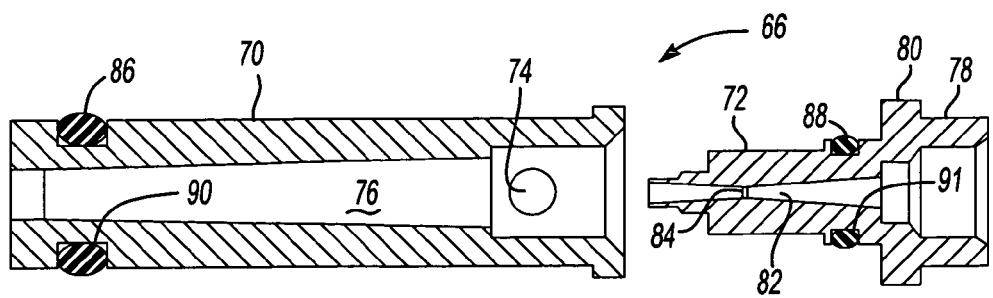
FIG. 6 illustrates a side view of the venturi of the present invention.

A venturi 66 removably received in a venturi hole 68 in the housing 34 provides the vacuum effect. As shown in FIG. 6, the venturi 66 includes a first part 70 and a second part 72. The first part 70 includes a vacuum hole 74 perpendicular to the length of the venturi 66 and a cylindrical passage 76 extending along the length of the venturi 66. The second part 72 includes an end 78 having a pair of opposing ears 80 and a passage 82 with a tapered portion 84. An arm 93 (FIG. 2) is connected to the end 78 of the venturi 66 to connect the connector hose 36 of the vacuum source 28 to the arm 93.

Seals 86 and 88 are positioned in grooves 90 and 91 in the first part 70 and the second part 72, respectively, to provide further sealing between the venturi 66 and the housing 34. Preferably, the seals 86 and 88 are o-rings. The venturi 66 operates in a conventional fashion as is known by those of ordinary skill in the art.

The venturi 66 produces a venturi effect within the central passage 38 of the housing 34 to secure the suction cup 22 to the object 26. The pressurized air source 28 provides pressurized air that flows through the connector hose 36, the arm 93, and then enters the end 78 of the first part 70 of the venturi 66. As the air passes through the tapered portion 84, a vacuum is produced within the vacuum hole 74 and the central passage 38 of the housing 34 to secure the suction cup 22 to the object 26.

Figure 7:
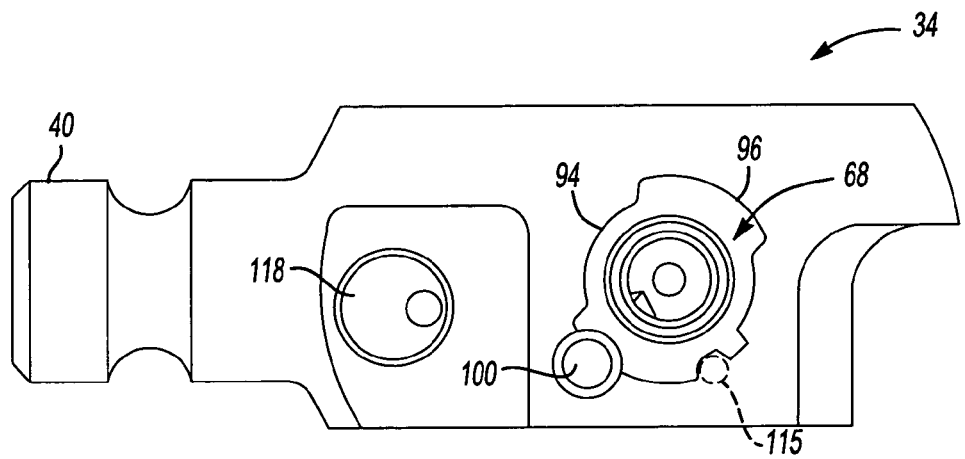
FIG. 7 illustrates a side view of the housing of the present invention.

As shown in FIGS. 4 and 7, the venturi 66 is removably received in the venturi hole 68 in a quick connect attachment. A ledge 92 extends around the circumference of the venturi hole 68. The housing 34 includes a pair of opposing flanges 94 and an opening 96 between each of the flanges 94 that is sized and shaped to receive one of the opposing ears 80 of the venturi 66. A gap 98 is defined between the ledge 92 and the flanges 94.

A pinhole 100 adjacent to the venturi hole 68 receives a pin 102 and a spring 104. The spring 104 is received in a recess 106 of the pin 102. The pin 102 also includes a through hole 108 that is perpendicular to the longitudinal axis D of the pin 102. The spring 104 biases the pin 102 into one of the opening 96 of the housing 34.

Returning to FIG. 5, a lock pin 110 is slidable in a slot 112 on the upper surface 114 of the housing 34. The lock pin 110 is received in the through hole 108 of the pin 102 (shown in FIG. 4) to couple the lock pin 110 to the pin 102.

When attaching the venturi 66 to the housing 34, the first part 70 of the venturi 66 is inserted in the venturi hole 68 until the ears 80 are positioned in the openings 96 and contact the ledge 92. In the non-attached position, the ears 80 are non-aligned with flanges 94. One of the ears 80 forces the pin 102 in direction E and into the pinhole 100, compressing the spring 104 so that the pin 102 does not enter the opening 96. The venturi 66 is then rotated approximately ninety degrees to the attached position such that the ears 80 are aligned with the flanges 94 and non-aligned with the openings 96. The venturi 66 is then in the attached position.

As shown in FIG. 7, a stop 115 positioned in the gap 98 under one of the flanges 94 prevents further rotation of the venturi 66 once the venturi 66 is in the attached position. In the attached position, the flanges 94 no longer contact the pin 102, and the pin 102 is biased by the spring 104 in direction F into the opening 96, securing the venturi 66 to the housing 34. The venturi 66 cannot be rotated to the non-attached position because the pin 102 prevents rotation.

To remove the venturi 66 from the housing 34, the lock pin 110 is moved in the slot 112 in direction E, removing the pin 102 from the opening 96 and compressing the spring 104. The venturi 66 can then be rotated ninety degrees to move the ears 80 out of alignment with the flanges 94 to the non-attached position. In the non-attached position, the ears 80 are positioned in the openings 96, and the venturi 66 can be removed from the housing 34.

As shown in FIG. 4, a blow off tube 116 is inserted into a blow off port 118 of the housing 34 to provide air through the central passage 38 of the housing 34 to release the suction cup 22 from the object 26. A connector hose 120 connected to the blow off tube 116 is employed to provide the blow off air.

Figure 8:
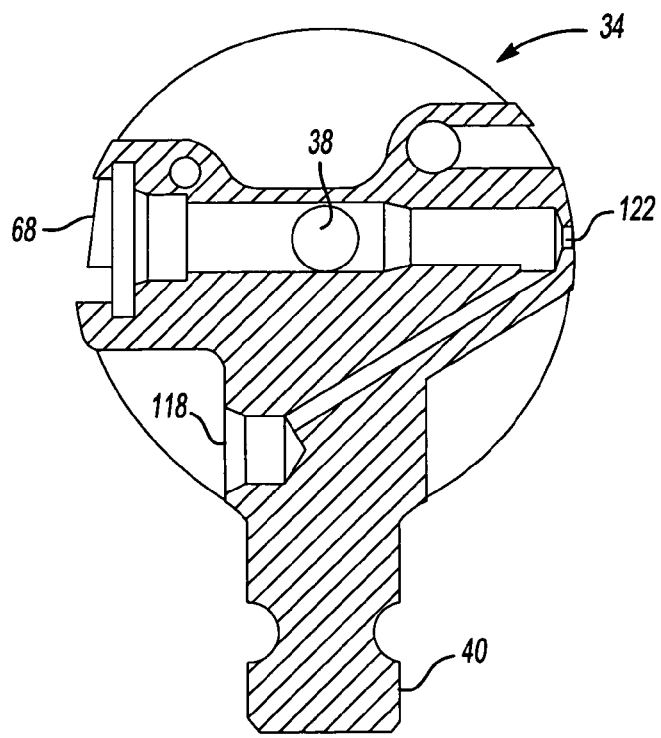
FIG. 8 illustrates a cross-sectional top view of the housing of the present invention.

As shown in FIGS. 5 and 8, the housing 34 further includes a small exhaust hole 122 that allows the air from the venturi 66 or the blow off tube 116 to escape from the housing 34. The venturi hole 68 extends through the housing 34 and communicates with the exhaust hole 122. The blow off port 118 is oriented proximate to the venturi hole 68 and also communicates with the exhaust hole 122.

Although a quick connect venturi has been illustrated and described, it is to be understood that other removably connected venturis can be employed. In one example, when the venturi is loaded into the venturi hole, a pivotal latch is pressed inwardly, compressing a spring under the latch. After the venturi is inserted into the venturi hole, the spring expands to move the latch outwardly, securing the venturi to the housing and the latch preventing removal of the venturi. The housing further includes a release that compresses the spring and releases and moves the latch to allow the venturi to be removed. Alternately, the venturi can be secured to the housing by a pin. The pin is inserted into a hole in the housing that aligns with a hole in the venturi. When the venturi is to be removed, the pin is removed, allowing removal of the venturi.

There are several advantages to the suction cup assembly of the present invention. As the housing 34 and the venturi 66 are combined, the number of parts and the height of the housing 34 can be reduced. Additionally, as there are fewer parts, the cost is reduced. The venturi 66 can also be easily removed for cleaning as the venturi 66 is attached in a quick connect attachment. Finally, because the exhaust hole 122 is small, a shuttle valve is not needed.

The foregoing description is exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention.

What is claimed is:

1. A venturi apparatus comprising:
a housing including a cavity, an opening, a flange, and a gap defined between said flange and said housing; and
a venturi removably attached to said housing and received in said cavity, said venturi creating a vacuum, wherein said venturi includes an ear received in said opening, of said housing when said venturi is in a non-attached position, wherein said venturi has an attached position and said non-attached position, and a resilient biased pin retains said venturi in said attached position, and wherein said venturi is rotated approximately 90° to said attached position, wherein said ear is received in said gap in said attached position.

2. The venturi apparatus as recited in claim 1 further including a resilient member, and said resilient biased pin is biased into said opening by said resilient member.

3. A venturi apparatus comprising:
a housing including a cavity, an opening, a flange, and a gap defined between said flange and said housing;
a venturi removably attached to said housing and received in said cavity, said venturi creating a vacuum, wherein said venturi includes an ear received in said opening of said housing when said venturi is in a non-attached position, wherein said venturi is rotated approximately 90° to an attached position, wherein said ear is received in said gap in said attached position; and
a pin and a resilient member, wherein said pin is biased into said opening by said resilient member,
wherein said ear presses said pin and compresses said resilient member when said venturi is in said non-attached position, said resilient member biases said pin in said opening when said venturi is rotated approximately 90° to said attached position, and said pin prevents rotation of said venturi to said non-attached position when said venturi is in said attached position.

4. The venturi apparatus as recited in claim 3 further including a release pin that engages said pin, and said release pin is slidable to move said pin and compress said resilient member to remove said pin from said opening, allowing said venturi to be rotated from said attached position to said non-attached position.

5. A venturi apparatus comprising:
a housing including a cavity, an opening, a flange, and a gap defined between said flange and said housing;
a venturi removably attached to said housing and received in said cavity, said venturi creating a vacuum, wherein said venturi includes an ear received in said opening of said housing when said venturi is in a non-attached position, wherein said venturi is rotated approximately 90° to an attached position, wherein said ear is received in said gap in said attached position;
a pin and a resilient member, wherein said pin is biased into said opening by said resilient member; and
a stop in said gap that prevents said venturi from rotating more than 90°.

6. A venturi apparatus comprising:
a housing including a venturi cavity and a suction cup cavity, wherein a suction cup is removably attached to said housing and said suction cup includes a portion received in said suction cup cavity;
a venturi removably attachable to said housing and securable in an attached position in said venturi cavity with a quick connect attachment, wherein said venturi creates a vacuum; and
a biased locking member that resists movement of said venturi from said attached position.

7. A venturi apparatus comprising:
a housing including a venturi cavity and a suction cup cavity, a flange, and a gap defined between said flange and said housing;
a venturi removably attached to said housing and received in said venturi cavity, said venturi creating a vacuum; and
a suction cup removably attached to said housing and said suction cup including a portion received in said suction cup cavity, said suction cup including an ear received in said suction cup cavity of said housing when said suction cup is in a non-attached position.

8. The venturi apparatus as recited in claim 7 wherein said suction cup is rotated approximately 90° to an attached position, wherein said ear is received in said gap in said attached position.

9. The venturi apparatus as recited in claim 8 further including a pin and a resilient member, and said pin is biased into said opening by said resilient member.

10. The venturi apparatus as recited in claim 9 wherein said ear presses said pin and compresses said resilient member when said suction cup is in said non-attached position, said resilient member biases said pin in said suction cup opening when said suction cup is rotated approximately 90° to said attached position, and said pin prevents rotation of said suction cup to said non-attached position when said suction cup is in said attached position.

11. The venturi apparatus as recited in claim 10 further including a release pin that engages said pin, and said release pin is slidable to move said pin and compress said resilient member to remove said pin from said suction cup opening, allowing said suction cup to be rotated from said attached position to said non-attached position.

12. The venturi apparatus as recited in claim 9 further including a stop in said gap that prevents said suction cup from rotating more than 90°.

13. A venturi apparatus comprising:
- a housing including a venturi cavity, a venturi opening, a venturi flange and a venturi gap defined between said venturi flange and said housing, and a suction cup cavity including a suction cup opening, a suction cup flange, and a suction cup gap defined between said suction cup flange and said housing;
- a venturi removably attached to said housing and received in said venturi opening, said venturi including a venturi ear received in said venturi opening of said housing when said venturi is in a venturi non-attached position, and said venturi is rotated to a venturi attached position such that said venturi ear is received in said venturi gap; and
- a suction cup removably attached to said housing and said suction cup including a portion received in said suction cup opening, said suction cup including a suction cup ear received in said suction cup opening of said housing when said suction cup is in a suction cup non-attached position, and said suction cup is rotated to a suction cup attached position such that said suction cup ear is received in said suction cup gap.

14. The venturi apparatus as recited in claim 13 wherein said venturi is inside said housing.

15. The venturi apparatus as recited in claim 13 further including a seal between said venturi and said housing.

16. The venturi apparatus as recited in claim 13 wherein said venturi includes a passage having a tapered portion, and said vacuum is created as air passes through said tapered portion.

17. A venturi apparatus comprising:
- a housing including a cavity;
- a venturi removably attachable to said housing and securable in an attached position in said cavity with a quick connect attachment, wherein said venturi creates a vacuum;
- a biased locking member that resists movement of said venturi from said attached position, wherein said biased locking member comprises an elongate locking pin and a spring, wherein said biased locking member comprises an elongated locking pin and a spring, said elongated locking pin being moveable between a locked position and an unlocked position; and a button coupled with said elongated locking pin, wherein said button is actuatable to move said elongated locking pin from said locked position to said unlocked position; and
- a locking member extendable through said button and receivable into said elongated locking pin, said locking member preventing said button from moving from said locked position to said unlocked position when said locking member is received into said elongated locking pin.

* * * * *

UNITED STATES PATENT AND TRADEMARK OFFICE
CERTIFICATE OF CORRECTION

PATENT NO. : 7,404,536 B2
APPLICATION NO. : 10/460847
DATED : July 29, 2008
INVENTOR(S) : Kalb Page 1 of 1

It is certified that error appears in the above-identified patent and that said Letters Patent is hereby corrected as shown below:

Claim 17, Column 8, line 21: "elongate" should read as --elongated--

Signed and Sealed this

Thirtieth Day of September, 2008

JON W. DUDAS
*Director of the United States Patent and Trademark Office*